W. G. BURGESS.
METHOD OF PLANING CURVILINEAR SURFACES.
APPLICATION FILED NOV. 16, 1908.
918,504.
Patented Apr. 20, 1909.
2 SHEETS—SHEET 1.
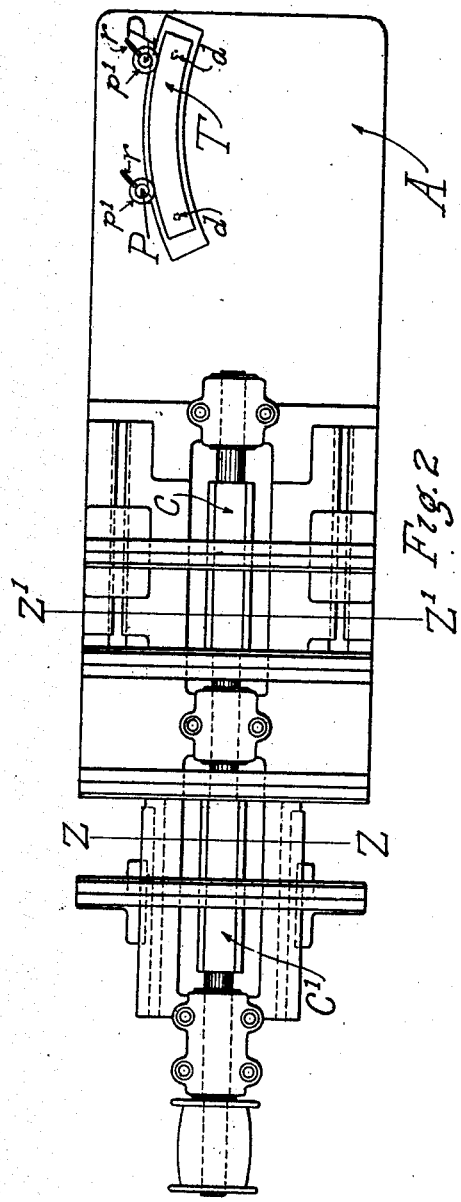
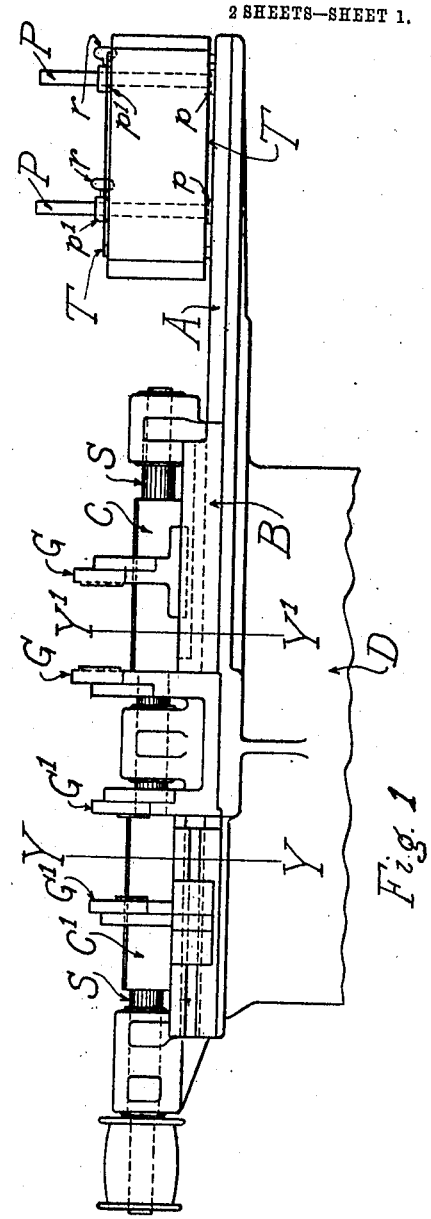
WITNESSES:
INVENTOR
William G. Burgess
BY
George C. King
his ATTORNEY W. G. BURGESS.
METHOD OF PLANING CURVILINEAR SURFACES.
APPLICATION FILED NOV. 16, 1908.
918,504.
Patented Apr. 20, 1909.
2 SHEETS—SHEET 2.
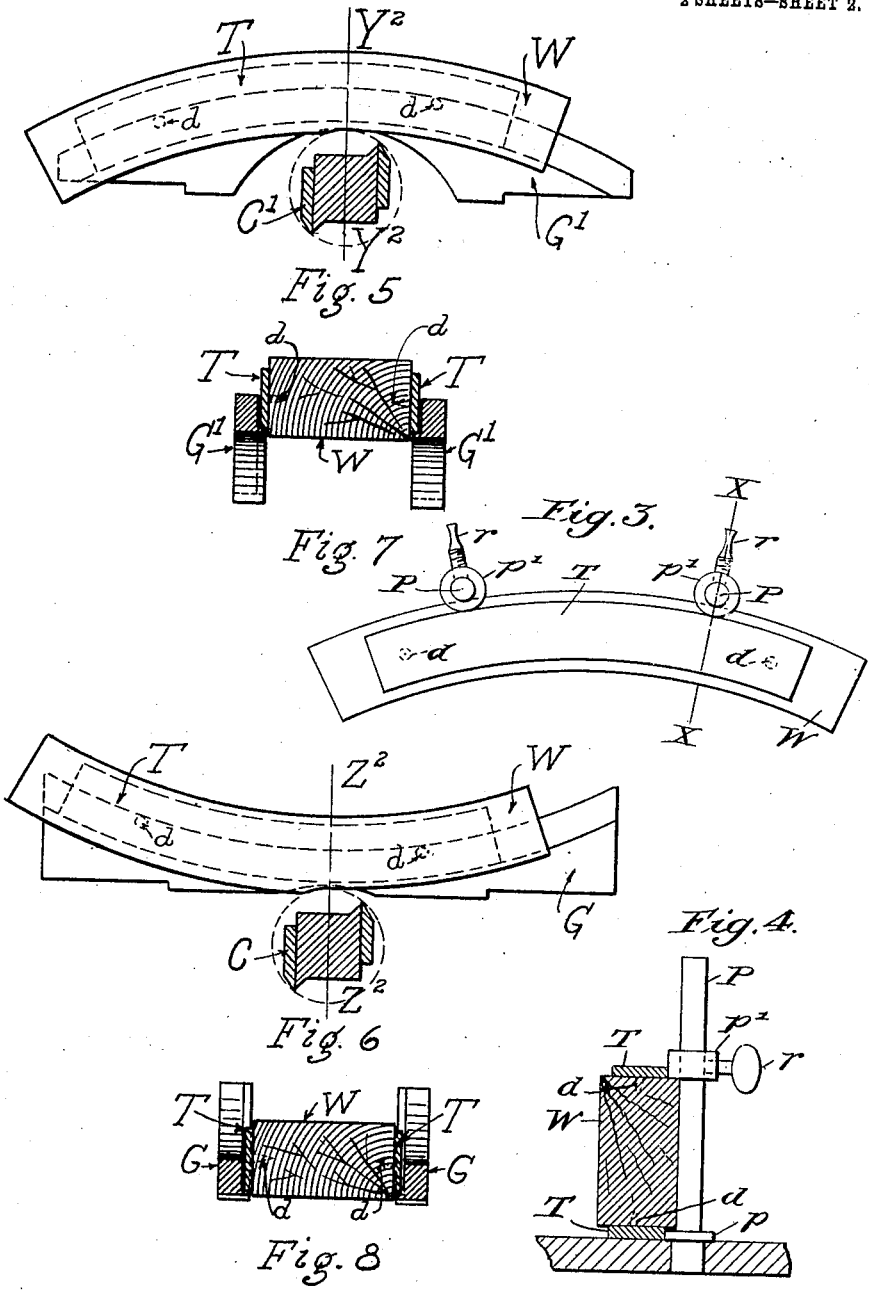

UNITED STATES PATENT OFFICE.

WILLIAM G. BURGESS, OF CLEVELAND, OHIO, ASSIGNOR TO THE BROWN HOISTING MACHINERY COMPANY, OF CLEVELAND, OHIO.

METHOD OF PLANING CURVILINEAR SURFACES.

No. 918,504.  Specification of Letters Patent.  Patented April 20, 1909.

Application filed November 16, 1908. Serial No. 462,752.

*To all whom it may concern:*

Be it known that I, WILLIAM G. BURGESS, of Cleveland, in the county of Cuyahoga and State of Ohio, have invented a new and useful Method of Planing Curvilinear Surfaces, of which I hereby declare the following to be a full, clear, and exact description including drawings accompanying the same, wherein similar parts are in each instance designated by the same letters.

While, generally speaking, the process to be described is applicable without regard to the material to be treated, its chief or practical use is in planing down, into curved surfaces, the wooden parts of brake or friction-blocks, brake-bands, fellies and the like.

As will be seen the purpose of this invention is to enable the finishing feature referred to, in planing operations of the above character, to be controlled by mechanisms that insure both accuracy and speed and at a general reduction in costs.

In said drawings Figure 1 is a side elevation of a planer equipped with the special feature of the method in question, with the work to be planed, in place, for the first step of said method. Fig. 2 is a plan view of Fig. 1. Fig. 3 is a plan view of a block or piece at the preliminary adjustment of the templets thereto. Fig. 4 is a transverse vertical sectional view through the line $x$ $x$ of Fig. 3. Fig. 5, is a like view through the lines Y Y and Z Z of Figs. 1 and 2, respectively. Fig. 6 is a similar view through the lines Y' Y' and Z' Z' of the same figures, and Figs. 7 and 8 are similar views through the lines $Y^2$ $Y^2$ and $Z^2$ $Z^2$ of Figs. 5 and 6 respectively.

The planer shown in Figs. 1 and 2 is of the usual type consisting, broadly speaking, of a supporting frame or stand D for a bed-plate B that carries a shaft or spindle S. The latter is provided with suitable cutting edges or blades C parallel therewith, and of length to correspond with the width of any cut they are to make. In line with the cutting edges C, on the spindle S, are located similar cutting edges or blades C'.

A squaring table A is conveniently fastened to and made to project from the frame D, of proper dimensions to receive the work. At suitable points thereon are located upright studs or pins P, provided, at their bases, with collar-like projections $p$, $p$, upon the upper surface or top of the table A. Said pins are also provided with similar collar disk-like pieces $p'$ $p'$ arranged to slide upon the same, and be adjustably fixed at any desired point thereon by means of set screws $r$ provided for the purpose. Said collar-like projections $p$, must not exceed in thickness the thickness of the templets hereinafter referred to.

In the drawings (Figs. 3 and 4) the piece to be planed, or work, indicated by W, is shown as pressed into bearing against the pins P. P. between upper and lower templets T and T' which, in turn, are represented as in bearing, respectively, against said projections and pieces $p$ and $p'$. These templets, of course, have the contour or outline of the desired segment when planed; in the present case such contour corresponds with the space between arcs of two concentric circles. It will be manifest, however, that the particular form or pattern of said templets, as well as the special mechanical features shown, may vary or be different from those of the several figures and still be within the invention for which a patent is sought. Dowel-pins $d$ $d$ are preferentially provided on one face of the templets.

Above and across the cutter-heads or knives C are located the parallel supports and concave guides G, at a distance, one from the other, substantially corresponding with the distance between a pair of templets when in their operative places on the opposite sides, respectively, of the work to be planed. The concaved track or surface on said guides G, thus obtained should, as indicated, be somewhat above the knives C, and, said guides should extend a sufficient distance on either side of the knives to enable the work to be brought to and be supported beyond the same. As will be evident the guides G, just described, are for use in reducing the outer side and surface of a given piece or segment; to serve the same office with respect to the inner side of such a piece, I provide a second pair of guides G' G', across and above said knives C, but converse, or reversely related to the same. Otherwise they are identical in every way with the knives C, as well as in their manner of mounting. Said guides G and G', it will be understood, must respectively conform, in contour, with the outer and inner edges of the templets that are to come into bearing with and be supported by said guides. In this case the guide G is concentric with the outer edge of the templet T, and the guide G' concentric with the inner edge of the same.

The several steps of my said method or process consist in first pressing a templet T', with its dowel-pins $d$ uppermost, against the lower projection $p$ and then bringing the wood or block to be turned (which should be rectangular in section) into exact bearing against the uprights P upon the points of said dowel-pins. A slight tap will now serve to drive the block down upon said dowel-pins and into a firm bearing against the lower templet; the sliding pieces $p'$ should next be brought down the uprights P, upon the top of the block W, and set in such relation by the screws. A second templet is pressed against these latter pieces $p'$ and driven home upon the wood and the wood will then be prepared for the planer itself. The block W, thus prepared, is lifted from the table T and seated in front of the cutter head or knives C, with the outer edges of the templets T and T' in bearing respectively upon the guides G (Figs. 6 and 8). The block thus supported may be now pushed forward against and across the knives C and, on one continuous movement, the outer face of said block be thereby planed. If, as in the illustrations herewith, the inner face of the block is also to be planed, said block is seated reversely upon the second pair of guides G' and G' in front of the knives, as represented in Figs. 5 and 7, and pushed against and across the same as before.

Having thus described my said method and shown its application in a specific case, what I claim and desire to secure by Letters Patent, is:—

A method of preparing curved templets and work to be treated in connection therewith for operation with a cutter having templet engaging devices which consists in providing a pair of rods adapted to be engaged by the curved surface of the work and having a pair of projecting portions adapted to be engaged by a curved surface of the templet when the latter is placed in proper position upon the work and the placing of said work and templets respectively in engagement with the said rods and projecting portions respectively and securing the templets to the work on the relative positions so determined by the rods and the projecting portions.

WILLIAM G. BURGESS.

In presence of—
RALPH McNEIL,
WM. L. ELY.